No. 633,267. Patented Sept. 19, 1899.
C. P. JENSEN & J. H. ROWE.
SUGAR BEET CULTIVATOR.
(Application filed June 12, 1899.)
(No Model.) 3 Sheets—Sheet 2.
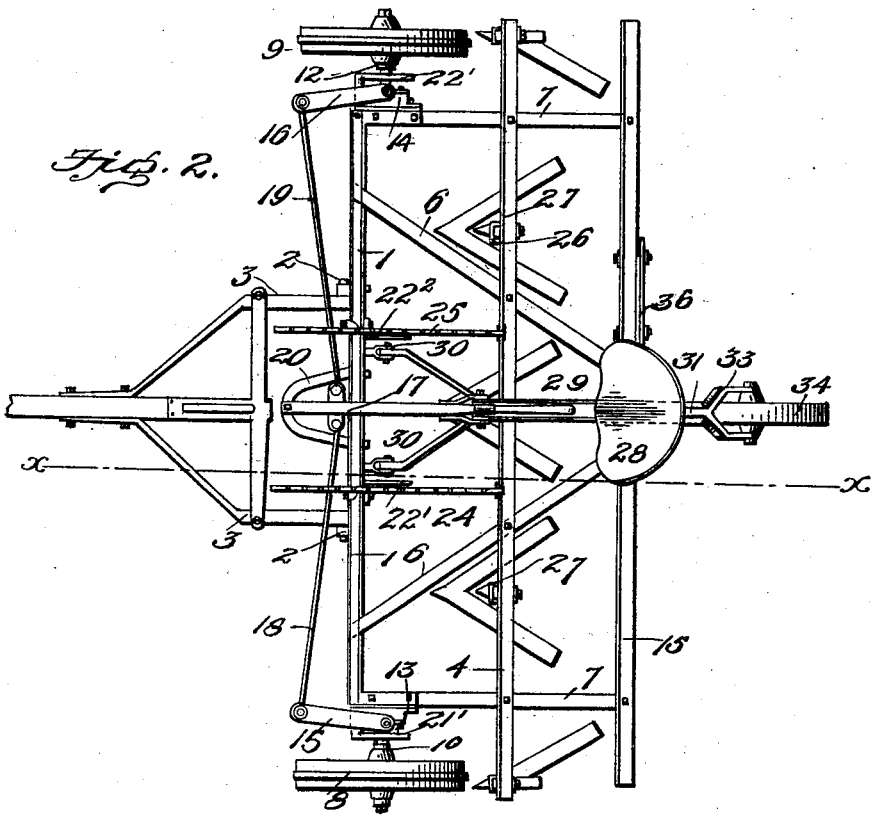
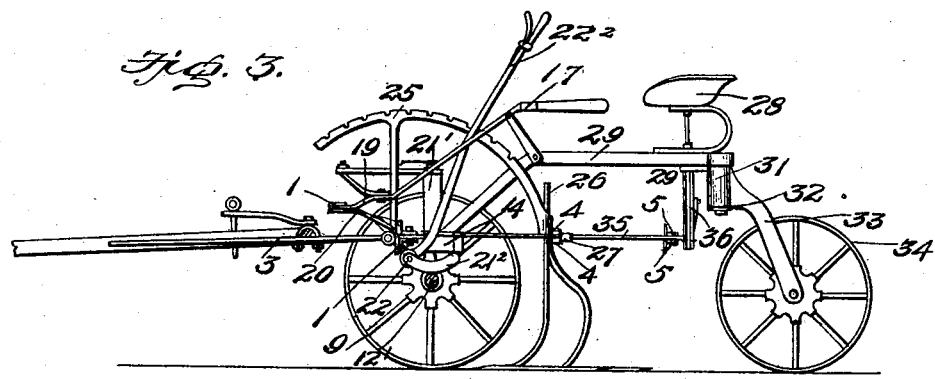
Witnesses
Inventors
C. P. Jensen and
J. H. Rowe
by their Attorneys No. 633,267. Patented Sept. 19, 1899.
C. P. JENSEN & J. H. ROWE.
SUGAR BEET CULTIVATOR.
(Application filed June 12, 1899.)
(No Model.) 3 Sheets—Sheet 3.
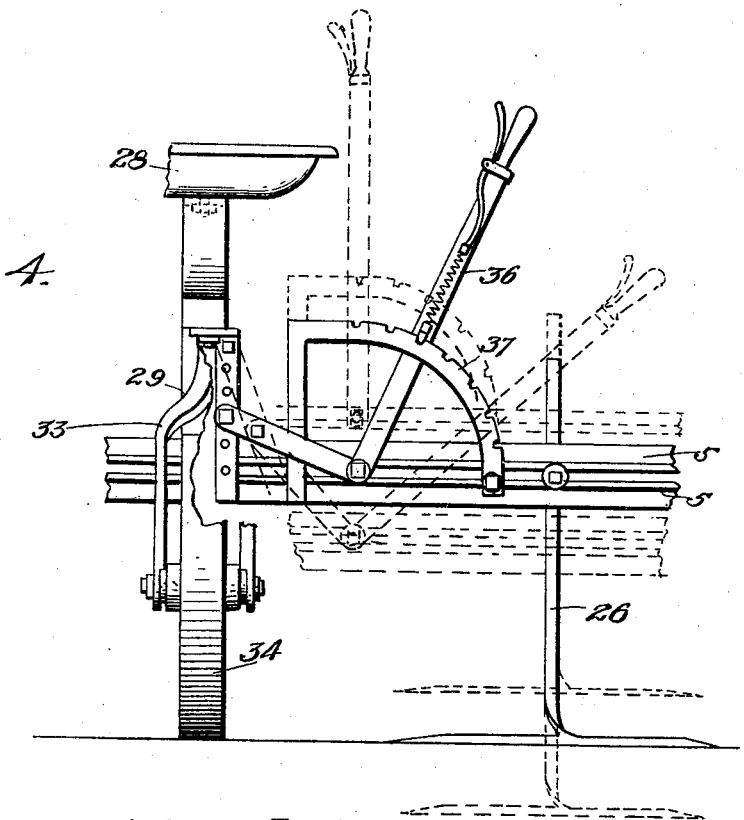
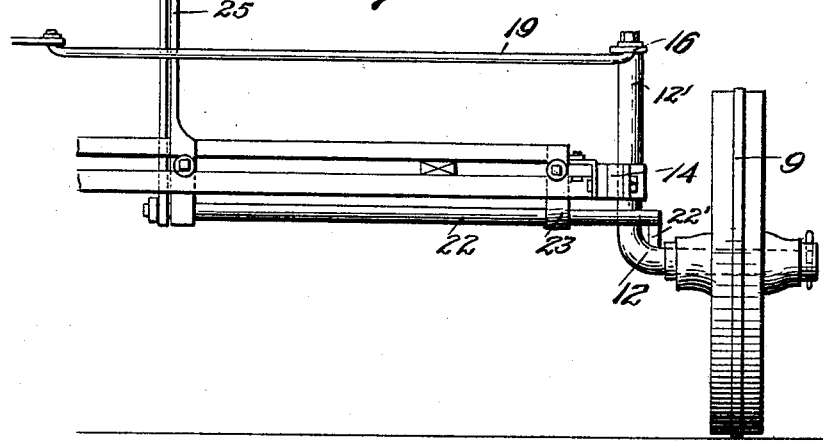

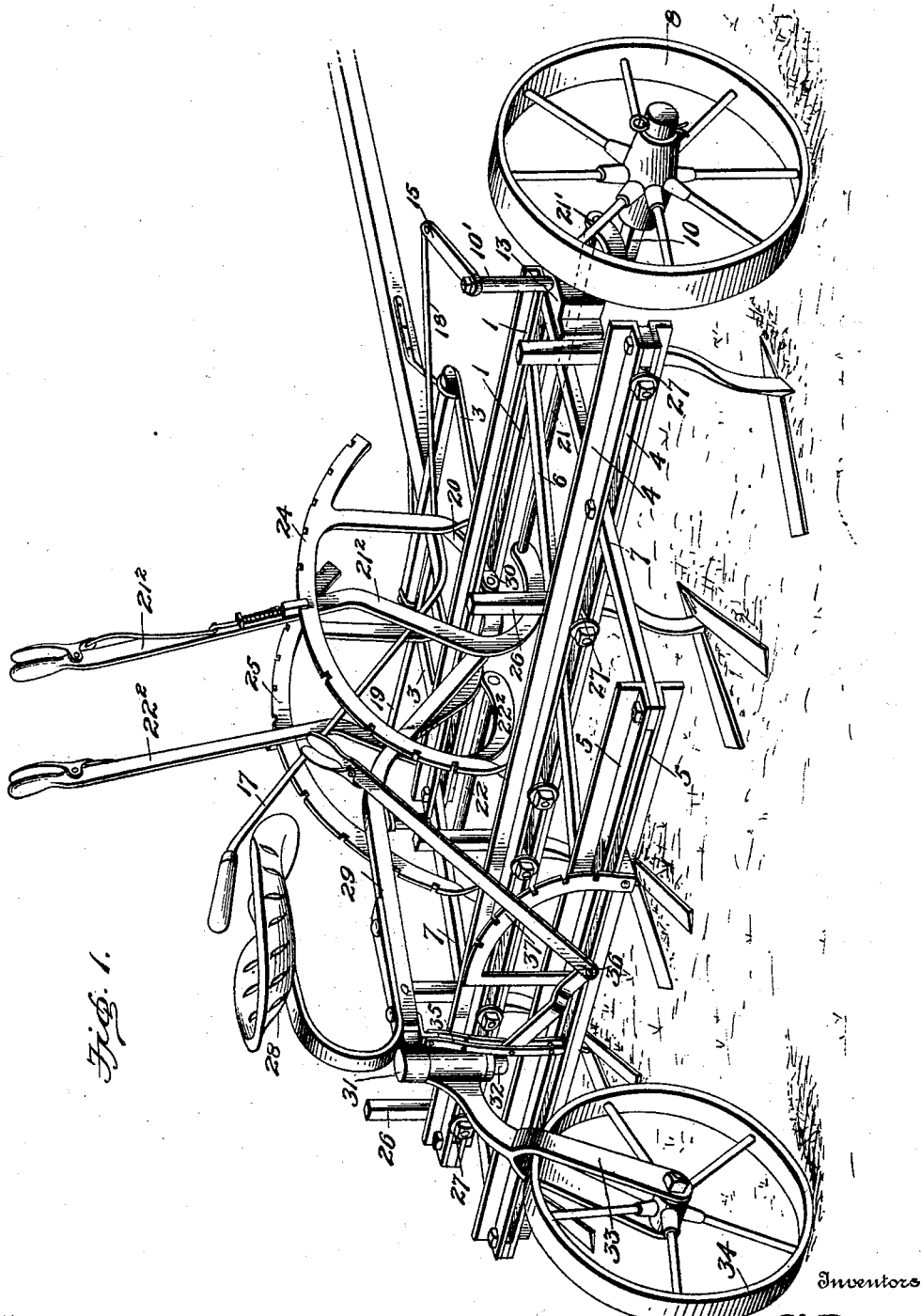

UNITED STATES PATENT OFFICE.

CHRIS P. JENSEN AND JAMES H. ROWE, OF WATSONVILLE, CALIFORNIA.

SUGAR-BEET CULTIVATOR.

SPECIFICATION forming part of Letters Patent No. 633,267, dated September 19, 1899.

Application filed June 12, 1899. Serial No. 720,326. (No model.)

*To all whom it may concern:*

Be it known that we, CHRIS P. JENSEN and JAMES H. ROWE, citizens of the United States, residing at Watsonville, in the county of Santa Cruz and State of California, have invented certain new and useful Improvements in Sugar-Beet Cultivators; and we declare the following to be a full, clear, and exact description of the invention, such as will enable others skilled in the art to which it appertains to make and use the same.

Our invention has relation to certain novel improvements in cultivators, and more particularly to that class of agricultural implements employed in the cultivation of sugar-beets; and the object is to provide a practical, efficient, and durable device of this character.

To this end the invention consists in the construction, combination, and arrangement of the several elements of the invention, as will be hereinafter more fully described and claimed.

In the accompanying drawings the same reference characters indicate the same parts of the invention.

Figure 1 is a perspective view of our improved sugar-beet cultivator. Fig. 2 is a top plan view of the machine. Fig. 3 is a longitudinal section on the line X X of Fig. 2. Fig. 4 is a detail rear elevation, and Fig. 5 is a similar view, of the guiding mechanism of the right-hand wheel.

The frame or carriage is built up of angle-iron or steel, comprising the parallel bars 1 1, to which the sockets 2 2 are clamped and which in turn receive the reaches 3 3, which support the tongue.

4 4 and 5 5 denote similar bars arranged parallel with those first named and connected thereto by the braces 6 6 and 7 7.

8 and 9 denote the main carrying-wheels, which are mounted on the independent axles 10 and 12, the vertical portions 10' and 12' of which are journaled in the brackets 13 14, fixed to the outside braces 7 7. These vertical portions are provided with crank-arms 15 16, the free ends of which are connected to a guiding-lever 17 by the rods 18 19, the lever being fulcrumed in the yoke 20, fixed to the bars 1 1.

21 and 22 denote transverse rock-shafts journaled in bearings 23 23, fixed to the bars 1 1, and their outer ends terminate in the curved arms 21' and 22', which have a bearing on the axles 10 and 12, and the inner ends of these rock-shafts are provided with hand-levers $21^2$ $22^2$, which coact with the notched racks 24 25, fixed to the carriage and by means of which the carriage-frame or either end of it may be independently raised or lowered.

26 26 denote the standards, which carry the cultivator-blades, and these are adjustably secured in the parallel bars 4 4 by the clamps 27.

28 denotes the riding-seat, fixed on the bifurcated bracket 29, the forward ends of which are pivoted in the clips 30 30, fixed to the bars 1 1. The rear end of the seat-bracket 29 is formed with a socket 31, in which is fixed a stud-shaft 32, on which is mounted the trailing-wheel bracket 33, carrying the trail-wheel 34. The rear portion of the carriage-frame is supported by this trailing-wheel through the medium of a strap 35, pivoted to the seat-bracket and to the shortest arm of the bell-crank lever 36, which may be adjusted by means of the notched rack 37, fixed to the bars 5 5. It will thus be seen that the driver is enabled to keep the machine level at all times with respect to the contour of the ground.

The accompanying drawings show our invention in the best form now known to us; but many changes in the details might be made within the skill of a good mechanic without departing from the spirit of our invention as set forth in the claims at the end of this specification.

Having thus fully described our invention, what we claim, and desire to secure by Letters Patent of the United States, is—

1. In a beet-cultivator, the combination with the carriage and the cultivator-blades, of the axle-bearings, the L-shaped axles, the rock-shafts journaled in the carriage, and formed with the curved arms having a bearing on the horizontal portion of said axles, and means for independently actuating said rock-shafts, substantially as and for the purpose set forth.

2. In a beet-cultivator, the carriage, the seat-bracket pivoted at its forward end to said carriage, a trailer-wheel carried by said seat-bracket, and a bell-crank lever connecting the rear end of said seat-bracket and carriage, substantially as and for the purpose set forth.

In testimony whereof we have hereunto set our hands in presence of two subscribing witnesses.

CHRIS P. JENSEN.
JAMES H. ROWE.

Witnesses:
JULIUS C. JENSEN,
PETER SAGER.